(12) United States Patent
Akashi et al.

(10) Patent No.: US 7,466,930 B2
(45) Date of Patent: Dec. 16, 2008

(54) OPTICAL RECEIVER MODULE AND OPTICAL RECEIVER MODULE SYSTEM

(75) Inventors: Mitsuo Akashi, Yokohama (JP); Tetsuya Aoki, Yokohama (JP); Hirofumi Nakagawa, Yokohama (JP)

(73) Assignee: Opnext Japan, Inc., Kanagawa (JP)

( * ) Notice: Subject to any disclaimer, the term of this patent is extended or adjusted under 35 U.S.C. 154(b) by 439 days.

(21) Appl. No.: 11/216,460

(22) Filed: Sep. 1, 2005

(65) Prior Publication Data

US 2006/0275043 A1 Dec. 7, 2006

(30) Foreign Application Priority Data

Jun. 7, 2005 (JP) .............. 2005-166551

(51) Int. Cl.
*H04B 10/06* (2006.01)
*H04B 10/08* (2006.01)
*H04B 17/00* (2006.01)

(52) U.S. Cl. ............... 398/209; 398/202; 398/208; 398/25; 398/28; 398/29

(58) Field of Classification Search ........... 398/158, 398/159, 162, 202, 208, 209, 210, 214, 28, 398/29
See application file for complete search history.

(56) References Cited

U.S. PATENT DOCUMENTS

| | | | |
|---|---|---|---|
| 6,871,024 | B2 | 3/2005 | Nishimoto et al. |
| 6,915,076 | B1 * | 7/2005 | Mittal et al. .......... 398/38 |
| 7,127,391 | B2 * | 10/2006 | Chang et al. .......... 704/230 |
| 2003/0161640 | A1 | 8/2003 | Kimura |
| 2004/0179837 | A1 * | 9/2004 | Bock et al. .......... 398/25 |

FOREIGN PATENT DOCUMENTS

| | | |
|---|---|---|
| EP | 1 187 372 A2 | 8/2001 |
| JP | 2002-208892 | 7/2002 |
| JP | 2004-254333 | 9/2004 |

OTHER PUBLICATIONS

European Search Report Issued in European Patent Application No. 05018731.9-1246, dated on Nov. 5, 2007.

* cited by examiner

*Primary Examiner*—Kenneth N Vanderpuye
*Assistant Examiner*—Daniel G Dobson
(74) *Attorney, Agent, or Firm*—McDermott Will & Emery LLP

(57) ABSTRACT

A relation between a light input power monitor value of an optical transmission signal before passing through a fiber and an input signal amplitude monitor value is recorded in advance in a storage device. Next, actual optical-transmission-waveform is inputted into an optical receiver module, and then comparisons between a light input power monitor value and an input signal amplitude monitor value, and respective monitor values in the case without having the waveform distortion as described above are performed in an operation device to calculate a waveform distortion value. According to the waveform distortion level calculated herein, an optimum threshold value and an optimum phase adjusting value, at which receiver sensitivity is maximized, are calculated in the operation device to control a threshold-value adjusting circuit and a phase-value adjusting circuit, thereby a threshold value and a phase value that are optimum for an input distortion level can be established.

3 Claims, 5 Drawing Sheets

— RECEIVED WAVEFORM BEFORE PASSING THROUGH FIBER
------ RECEIVED WAVEFORM AFTER PASSING THROUGH FIBER
● OPTIMUM IDENTIFICATION POINT BEFORE PASSING THROUGH FIBER
○ OPTIMUM IDENTIFICATION POINT AFTER PASSING THROUGH FIBER

OPTICAL RECEIVER MODULE AND OPTICAL RECEIVER MODULE SYSTEM

CLAIM OF PRIORITY

The present application claims priority from Japanese patent application serial no. 2005-166551,filed on Jun. 7, 2005,the content of which is hereby incorporated by reference into this application.

BACKGROUND OF THE INVENTION

1. Field of the Invention

The present invention relates to an optical receiver module and an optical receiver module system, and particularly relates to an optical receiver module and an optical receiver module system which are designed to remedy deterioration of a transmission characteristic (i.e. transmission penalty) in long-distance transmission.

2. Description of the Related Art

Regarding waveform distortion due to dispersion and polarization, reduction in transmission penalty is indispensable technique in a large-capacity long-distance optical transmission system because influence of the distortion becomes large with increase in distance in transmission and increase in bit rate.

Methods for suppressing the transmission penalty in the long-distance optical transmission include compensation of the waveform distortion using a variable dispersion compensator. The variable dispersion compensator gives an opposing dispersion level to an optical waveform having waveform distortion caused by the effect of fiber dispersion, and thus reproduces an original waveform before having the distortion. There is a method in which a code error information monitor circuit added to an optical receiver is added to monitor code error information at anytime, and thereby a dispersion value of the variable dispersion compensator is controlled such that code error due to waveform distortion after fiber transmission does not occur, so that the waveform distortion is suppressed, which is described in JP-A No. 2002-208892.

There is another method wherein a received signal is inputted into a band-pass filter and the variable dispersion compensator is controlled such that power output from the filter is minimized, which is described in JP-A No. 2004-254333.

In the case of the compensation of waveform distortion by the variable dispersion compensator using the code error information monitor circuit described in JP-A-2002-208892, an error correction circuit (FEC: Forward Error Correction) is used as the code error correction information monitor circuit. Since functions of an optical transceiver module is generally restricted to a function specialized to optic-electric signal conversion, the module does not have the FEC function. The FEC function can be realized by an LSI having the FEC function, which is mounted on a substrate for mounting the optical transceiver module on a system side. If the FEC function is provided on the optical transceiver module, it causes increase in size or increase in power consumption of the module. The FEC function is not necessary in applications in some system configurations, and in this case, the compensation of waveform distortion using the code error information monitor cannot be used.

The method using the band-pass filter described in JP-A No. 2004-254333 causes an increase in size, because the band-pass filter needs to be provided in the optical transceiver module. Moreover, the band-pass filter is generally expensive, leading to an increase in cost.

The method using the variable dispersion compensator for responding to the issue of reducing the transmission penalty cannot meet the demand for the optical transceiver module, including reduction in size, power consumption, and cost.

Therefore, technique of suppressing deterioration of receiver sensitivity due to fiber dispersion is essential in a method without using the variable dispersion compensator. Again in this case, technique for preventing increase in size, power consumption, and cost of the optical transceiver module is indispensable.

SUMMARY OF THE INVENTION

A distortion level of an input waveform is detected using an input signal amplitude monitor value and a light power monitor value provided in the optical transceiver module. A threshold value and a phase adjusting value are adjusted according to the distortion level, and thereby a threshold value and a phase adjusting value, both the values being optimum for the input waveform, are established.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Preferred embodiments of the invention will be described using several embodiments with reference to drawings. Substantially the same elements are marked with same signs, and not described repeatedly.

Figure 1:
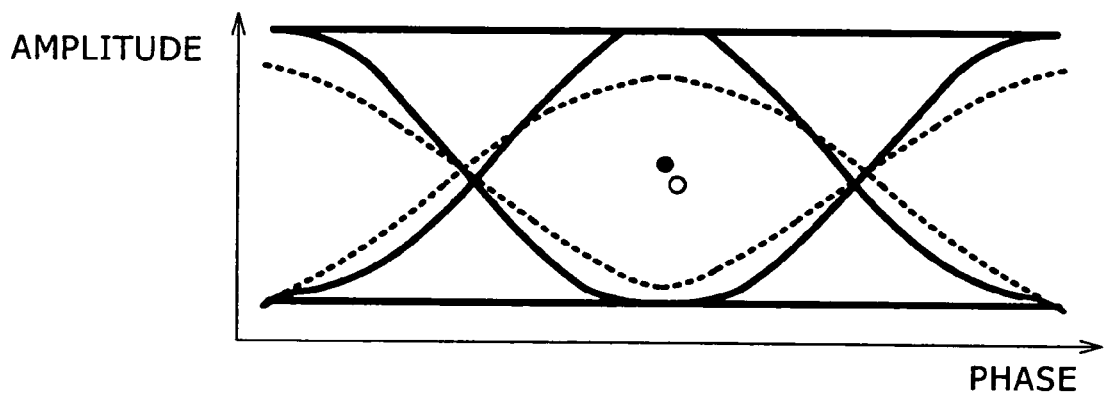
FIG. 1 is eye patterns for illustrating deterioration of a waveform received through a fiber.
Figure 2:
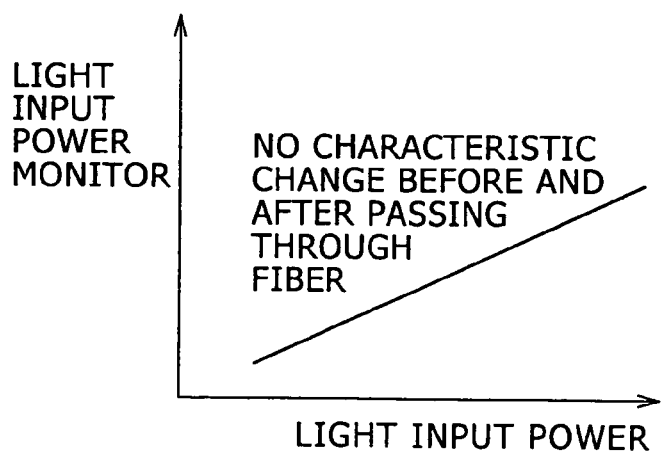
FIG. 2 is a view for illustrating a relation between a light input power value and a light input power monitor value.
Figure 3:
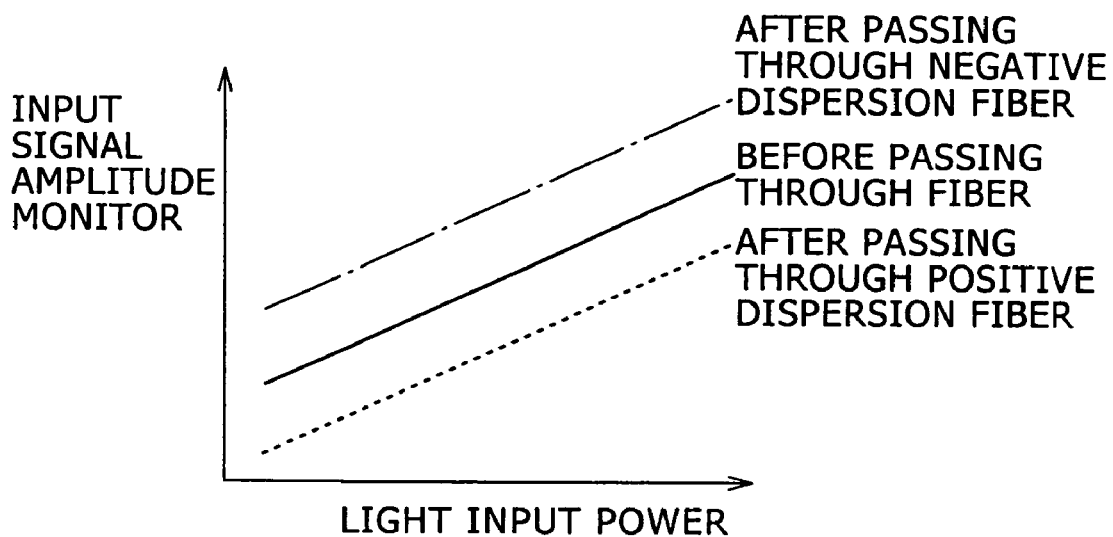
FIG. 3 is a view for illustrating a relation between the light input power value and an input signal amplitude monitor value.
Figure 4:
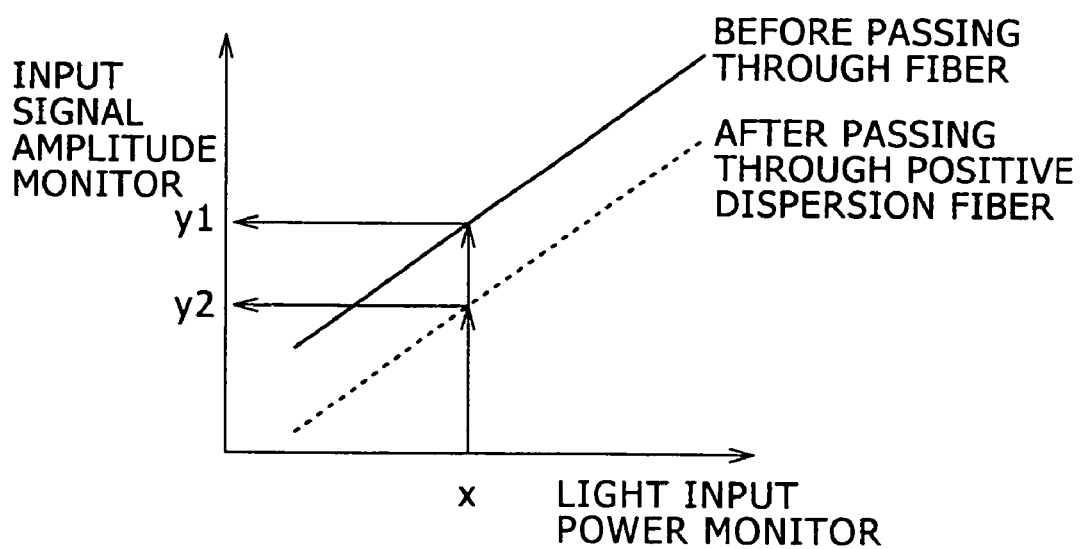
FIG. 4 is a view for illustrating a relation between the light input power monitor value and the input signal amplitude monitor value.
Figure 5:
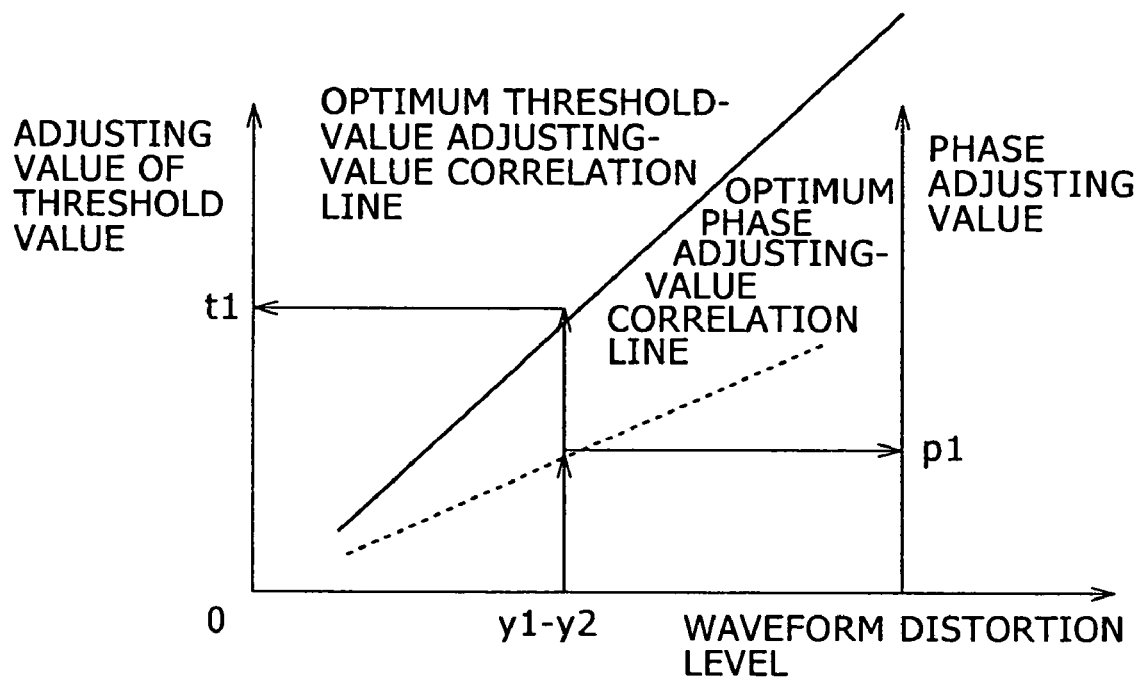
FIG. 5 is a view for illustrating a procedure for obtaining an optimum adjusting value of a threshold value and an optimum phase adjusting value from a waveform distortion level and an optimum threshold-value correlation line or an optimum phase-value correlation line.
Figure 6:
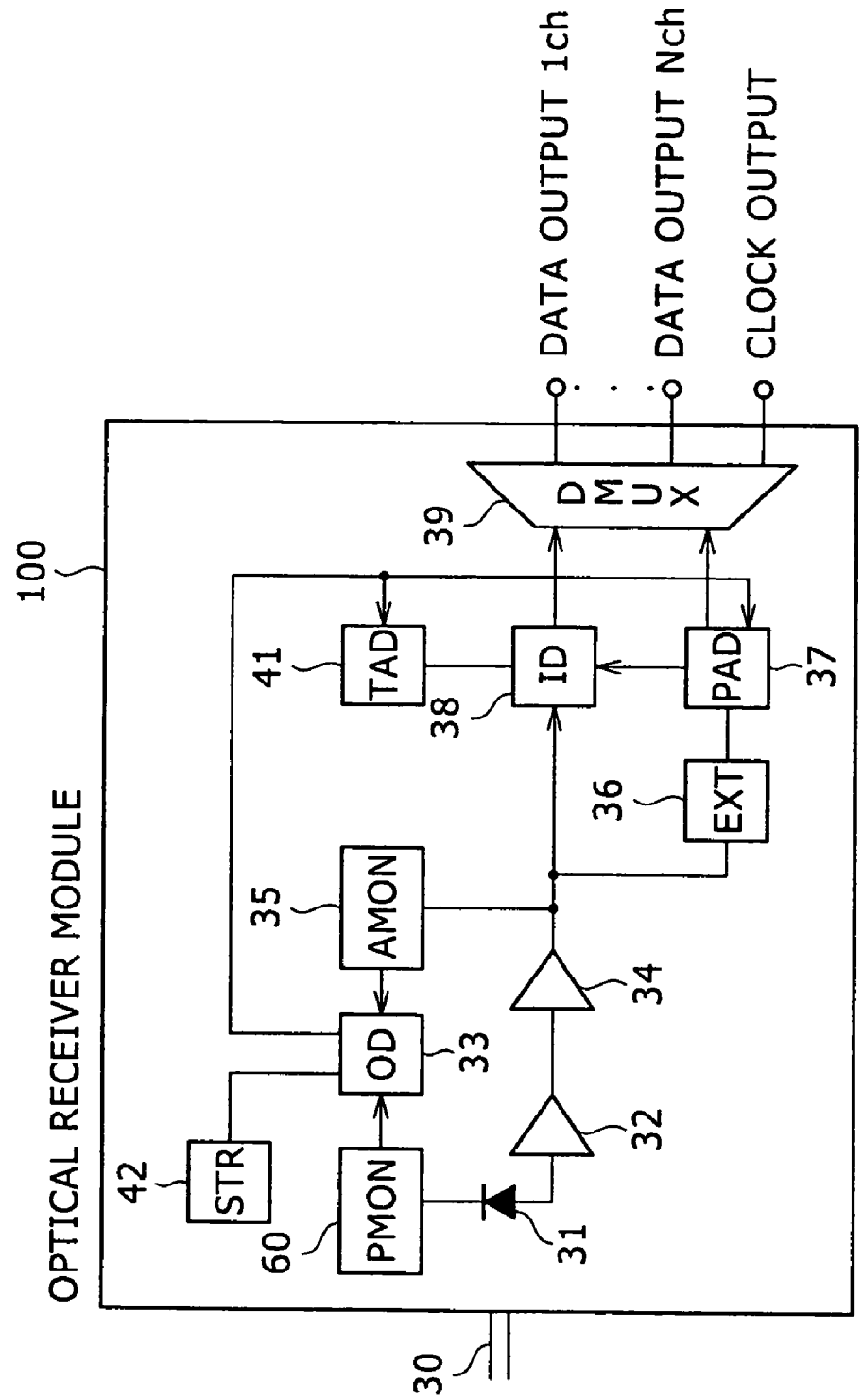
FIG. 6 is a block diagram of an optical receiver module.

Embodiment of the invention is described using FIGS. 1 to 6. Here, FIG. 1 is eye patterns for illustrating deterioration of a waveform received through a fiber. FIG. 2 is a view for illustrating a relation between a light input power value and a light input power monitor value. FIG. 3 is a view for illustrating a relation between the light input power value and an input signal amplitude monitor value. FIG. 4 is a view for illustrating a relation between the light input power monitor value and the input signal amplitude monitor value. FIG. 5 is a view for illustrating a procedure for obtaining an optimum adjusting value of a threshold value and an optimum phase adjusting value from a waveform distortion level and an optimum threshold-value correlation line or an optimum phase-value correlation line. FIG. 6 is a block diagram of an optical receiver module.

The eye patterns shown in FIG. 1 are made by drawing a received waveform shown by a solid line, which was obtained by back-to-back connection before passing through a transmission fiber, and a received waveform after passing through the transmission fiber having a positive dispersion characteristic in a superimposed manner. In the eye patterns, a phase (time) is shown in abscissa, and amplitude is shown in ordinate. Generally, in the optical receiver module, the threshold value and the phase adjusting value are set at a point where receiver sensitivity is maximized with respect to a transmission signal without having waveform distortion before passing through the optical fiber, that is, SN (Signal to Noise Ratio) is maximized. The phase adjusting value is an optimum identification point shown at the center of the eye pattern before passing through the fiber. However, the optimum identification point shifts to the lower right in FIG. 1 after passing through the fiber. The reason for this is that the eye pattern is influenced by dispersion during passing through the fiber, resulting in waveform distortion. An additional reason for this is that the waveform distortion is non-linear. Particularly, it strongly depends on a drive operation point of an optical modulator used in a transmitter.

It is known from the above that the optimum threshold value of amplitude and the optimum phase can be set for the waveform after passing through the fiber in order to suppress the transmission penalty.

A method for obtaining a waveform distortion level (described later) is described with reference to FIG. 2 to FIG. 5. First, FIG. 2 shows a relation between light input power into the optical receiver module and output of a light input power monitor of the optical receiver module. As shown in FIG. 2, there is no change in characteristics in relations between the two before and after passing through the fiber. Naturally, the input power of the light after passing through the fiber is different from that before passing through the fiber due to passage loss. However, the fact remains that they lie on one line.

On the other hand, a relation between the light input power into the optical receiver module and output of an input signal amplitude monitor of the optical receiver module depends on a characteristic of the optical fiber through which an optical signal has passed. In an optical signal that has passed through an optical fiber having a positive dispersion characteristic (positive dispersion fiber), which is a typical optical transmission path, the output value of the input signal amplitude monitor shifts to a minus side with respect to the output value before passing through the fiber. On the other hand, the output value of the input signal amplitude monitor shifts to a plus side in the case of an optical signal transmitted through a fiber having a negative dispersion characteristic, typically including a dispersion compensation fiber.

Regarding the positive dispersion fiber, FIG. 4 is obtained from FIGS. 2 and 3. FIG. 4 shows a relation between the output value of the light input power monitor of the optical receiver module and the output value of the input signal amplitude monitor. There is no change in relations between the light input power into the optical receiver module and the output of the light input power monitor of the optical receiver module before and after passing through the fiber, and they lie collinearly. Therefore, even if the x-axis represents the light input power monitor, FIG. 4 indicates the same relation as in FIG. 3. By using this, the distortion level of the waveform can be found from the relation between the output of the light input power monitor and the output of the input signal amplitude monitor. When the output value of the light input power monitor is x, the output value of the input signal amplitude monitor before passing through the fiber is y1. On the other hand, the output value of the input signal amplitude monitor after passing through the fiber is y2. The case that y1 is approximately equal to y2 is a case that a transmission distance is short, or the optical signal has passed through a dispersion shift fiber (DSF). The case of y1>y2 is a case that it has passed through a positive dispersion fiber, and the case of y1<y2 is a case that it has passed through a negative dispersion fiber. In this specification, y1−y2 is called waveform distortion level.

The identification point after the optical signal has passed through the fiber in the eye pattern shown in FIG. 1 naturally varies depending on a transmission distance. Those were experimentally obtained, and results are shown by an optimum threshold-value correlation line and an optimum phase-value correlation line in FIG. 5. In FIG. 5, the optimum threshold-value correlation line and the optimum phase-value correlation line intersect with 0 on the y-axis at a waveform distortion level of 0. While FIG. 5 is a view after passing through the positive dispersion fiber here, both the x-axis and the y-axis lie in negative regions after passing through the negative dispersion fiber.

When the waveform distortion level is y1−y2, the adjusting value of the threshold value is found to be t1 from an intersection with the correlation line of the optimum adjusting value of the threshold value. Similarly, the phase adjusting value is found to be p1 from an intersection with the correlation line of the optimum phase adjusting value.

In FIG. 6, an optical receiver module 100 is connected to an optical transmission fiber 30. The optical receiver module 100 includes a light receiving element 31 that receives an optical signal and performs O/E conversion (conversion from an optical signal to an electric signal) to the signal; a light input power monitor (PMON) 60 that is connected in series to the light receiving element 31 and monitors an average value of light power of the optical signal inputted into the optical receiver module 100; a preamplifier 32 connected in series to the light receiving element 31; a post-amplifier 34; a clock extraction circuit (EXT) 36 for extracting a clock from output of the post-amplifier 34; an identification circuit (ID) 38 for identifying a signal using the output of the post-amplifier 34 and the clock sampled by the clock extraction circuit 36; a demultiplexing circuit (DMUX) 39 for demultiplexing an identified electric signal at 40 Gbits/s output from the identification circuit 38 into four signals at 10 Gbits/s; an input signal amplitude monitor (AMON) 35 for detecting an output signal amplitude (peak to peak value) from the output of the post-amplifier 34; an operation device (OD) 33 that is inputted with output of the light input power monitor 60 and output of the input signal amplitude monitor 35, and connected to a storage device (STR) 42; a threshold-value adjusting circuit (TAD) 41 that is inputted with output of the operation device 33 and thereby adjusts a threshold value to be supplied to the identification circuit 38; and a phase adjusting circuit (PAD) 37 that is inputted with the output of the operation device 33 and thereby adjusts a phase of the clock.

In the storage device 42, (1) data indicating a relation of the input-signal amplitude monitor value to the light input power monitor value before passing through the fiber (data at different parameters in FIG. 4), and (2) data indicating relations of the optimum adjusting value of the threshold value and the optimum phase adjusting value to displacement between the input signal amplitude monitor value before passing through the fiber (in the case without having waveform distortion) and the input signal amplitude monitor value after passing through the fiber (FIG. 5) are previously stored. Although only the data after passing through the fiber having a particular length is depicted in FIG. 4, various values in the case of fibers having various lengths (or dispersion values) are stored in the storage device.

In practical operation, the operation device 33 first calculates a monitor value y1 in the case without having the waveform distortion in the light input power monitor detected by the light input power monitor 60. Then, the operation device 33 calculates a waveform distortion level y1−y2 by comparing the input signal amplitude monitor value y2 detected by the input signal amplitude monitor 35 to the calculated monitor value y1. The operation device 33 calculates the optimum adjusting value of the threshold value t1 and the optimum phase adjusting value p1, at which the receiver sensitivity is maximized, according to the calculated waveform distortion level; and controls the threshold-value adjusting circuit 41 and the phase adjusting circuit 37, thereby sets the threshold value and the phase value which are optimum for the input distortion level. Thus, the transmission penalty characteristic can be improved. The phase adjusting circuit 37 adjusts only a clock phase to the identification circuit 38, and supplies a clock to the demultiplexing circuit 39 without adjusting the phase.

A microprocessor (MPU) or a digital signal processor (DSP) can be used for the operation device 33. The storage device 42 can be one incorporated in the operation device. Alternatively, flash memory or EEPROM can be used for the device. The signal monitored by the input signal amplitude monitor 35 can be output of the preamplifier 32. This embodiment can be applied to an optical transceiver module integrated with the optical transmitter module. The optical transceiver module can be included in the optical receiver module.

According to this embodiment, the input amplitude monitor is observed at any time to control the threshold-value adjusting circuit and the phase-value adjusting circuit, therefore even if the input signal waveform is dynamically varied, the optimum threshold value and the optimum phase value can be set, and thereby the transmission penalty characteristic of the optical receiver module can be improved.

Figure 7:
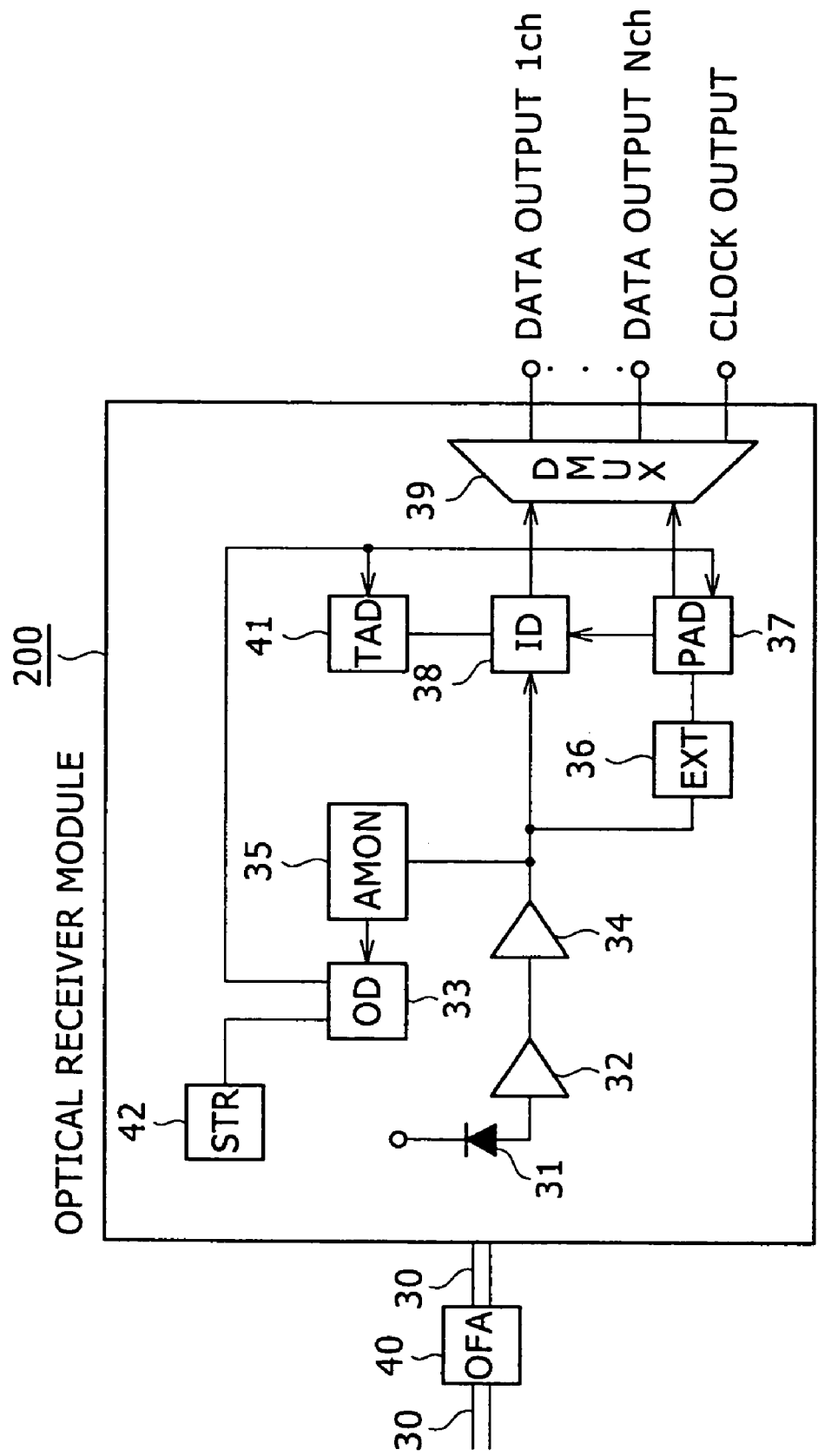
FIG. 7 is a block diagram of an optical receiver module of another embodiment.

Hereinafter, another embodiment of the invention is described using FIG. 7. Here, FIG. 7 is a block diagram of an optical receiver module. As found from comparison with the optical receiver module 100 in FIG. 6, the optical receiver module 200 in FIG. 7 is different from the module 100 only in a point of absence of the light power monitor. Therefore, a description is made only on different points.

In FIG. 7, a low-noise optical fiber amplifier (OFA) 40 for causing input power into the optical receiver module 200 to be constant is disposed at a previous stage of the optical receiver module 200. In this case, light power inputted into the optical receiver module is constant. Therefore, the optical receiver module 200 does not require the light power monitor. The optical receiver module 200 has an input signal amplitude monitor 35, and thereby detects amplitude of output signal (peak to peak value) from the post-amplifier 34. A monitored value of the output signal amplitude is subjected to digital conversion in the input signal amplitude monitor 35, and the converted value is transmitted to an operation device 33.

In a storage device 42, (1) data indicating a monitor value y1 of an input signal amplitude before passing through a fiber (in the case without having waveform distortion) corresponding to output of the optical fiber amplifier 40, and (2) data indicating a relation of the optimum adjusting value of the threshold value and the optimum phase adjusting value to the waveform distortion level (FIG. 5) are stored in advance.

In practical operation, an operation device 33 calculates a waveform distortion level y1−y2 by comparing an input signal amplitude monitor value y2 to the monitor value y1 in the case without having the waveform distortion. The operation device 33 calculates the optimum adjusting value of the threshold value t1 and the optimum phase adjusting value p1, at which the receiver sensitivity is maximized, according to the calculated waveform distortion level; and controls a threshold-value adjusting circuit 41 and a phase adjusting circuit 37, thereby sets the threshold value and the phase value which are optimum for the input distortion level. Thus, the transmission penalty characteristic can be improved.

Here, the optical fiber amplifier can be a semiconductor optical amplifier subjected to APC (Automatic Power Controller) control or ALC (Automatic Level Controller) control, or can be other optical amplifiers.

According to this embodiment, the optical amplifier is disposed at the previous stage of the optical receiver module, thereby an optical receiver module system having a simplified configuration of the optical receiver module can be obtained.

According to the invention, the transmission penalty characteristic of the optical receiver module can be improved.

What is claimed is:

1. An optical receiver module comprising:
    a light receiving element that receives an optical signal and converts the optical signal into an electric signal;
    an amplifier for amplifying said electric signal;
    a clock extraction circuit for extracting a clock from the amplified electric-signal;
    an identification circuit for generating an electric signal for identification from the amplified electric-signal and the clock;
    a light input power monitor that is connected to said light receiving element and monitors an average value of light power of said optical signal;
    an input signal amplitude monitor for detecting signal amplitude from said amplified electric-signal;
    an operation device that is inputted with output of said light input power monitor and output of said input signal amplitude monitor, and thereby outputs an adjusting value of a threshold value of said identification circuit and an adjusting value of a phase of said clock; and
    a storage device connected to said operation device, wherein:
    said storage device stores first data indicating a relation between an input signal amplitude before passing through a fiber in a predetermined input power level and a plurality of amplitudes of input signals after passing through fibers at a plurality of dispersion levels, and second data indicating a relation of the optimum adjusting values of the threshold value and the optimum phase adjusting values to waveform distortion levels, and
    said operation device calculates a difference between an input signal amplitude before passing through a fiber and an input signal amplitude after passing through the fiber by comparing a first output of the light input monitor, a second output of the input signal amplitude monitor and said first data, treats said difference as a waveform distortion level, and obtains an optimum adjusting value of the threshold value and an optimum phase adjusting value by comparing said waveform distortion level and said second data.

2. The optical receiver module according to claim 1, further comprising: a phase adjusting circuit that is inputted with the adjusting value of said phase, thereby adjusts a clock phase.

3. The optical receiver module according to claim 1, further comprising:
    a threshold-value adjusting circuit that is inputted with the adjusting value of said threshold value, thereby supplies the threshold value to said identification circuit.

* * * * *